INVENTOR.
VICTOR E. RIMSHA
BY
Edwin Coates
ATTORNEY.

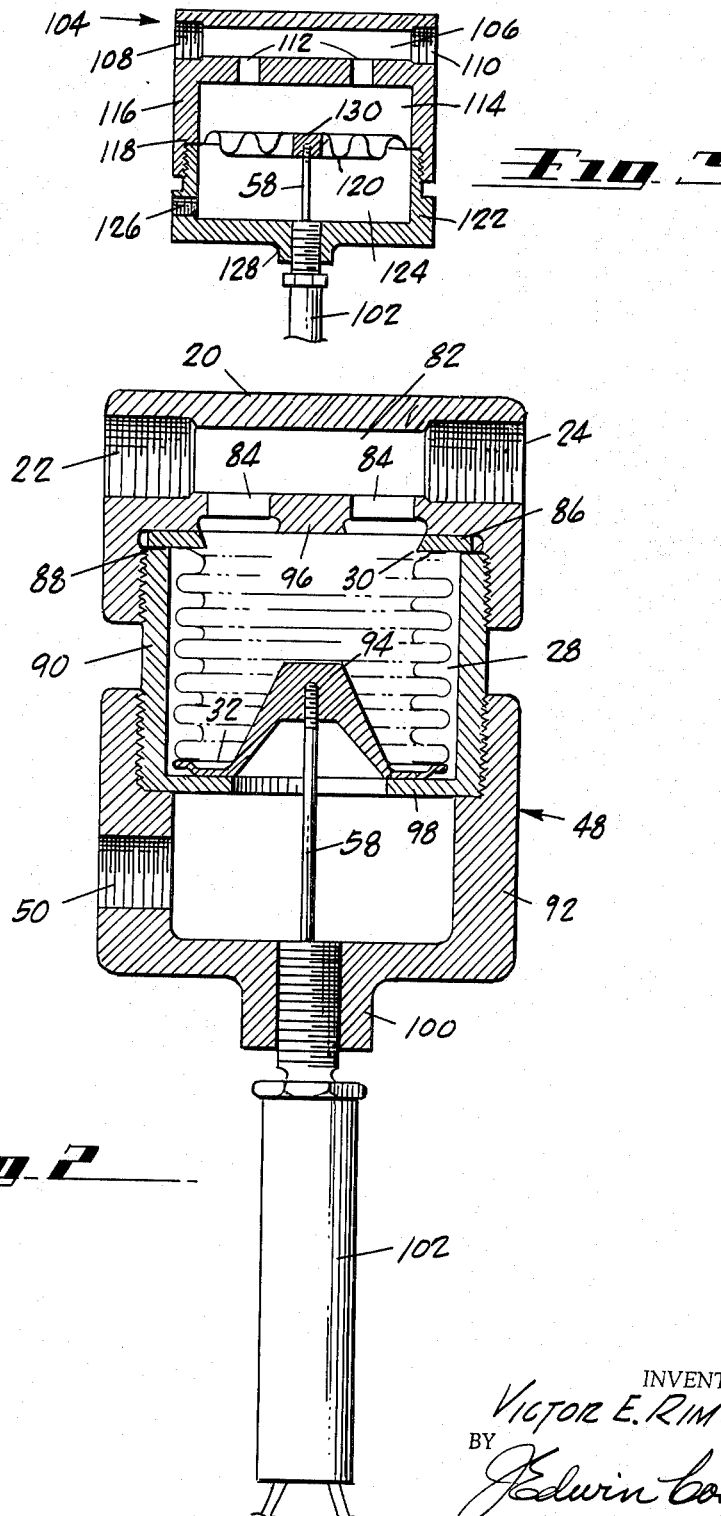

United States Patent Office 3,234,785
Patented Feb. 15, 1966

3,234,785
FLOW MEASURING SYSTEM
Victor E. Rimsha, Santa Ana, Calif., assignor, by mesne assignments, to Douglas Aircraft Company, Inc., Santa Monica, Calif.
Filed May 27, 1963, Ser. No. 283,494
11 Claims. (Cl. 73—113)

This invention relates in general to the field of analysis of rocket engine operation and is directed particularly to a system for accurately measuring the flow of propellant fluid during very short-time pulses and presenting such measurements in suitable form for comparison with the timing and operation of the various control instrumentalities.

Rocket engines which are used for propelling space vehicles through great distances do not present too serious a problem of analysis of control and operation because the duration of the thrust is several minutes, and errors relating to the rise and decay of propellant flow and thrust during periods of milliseconds have a very small percentage effect on total measurements. However, the problem becomes quite different with orientation or attitude control, for which relatively small rocket engines operating for short periods of time have come into considerable favor in recent years.

When these small attitude control engines, from about fifty to two hundred pounds thrust, are operated for several seconds, the total time of operation gives a fair indication of the total impulse. However, the error can still be substantial because of the changing flow rate during rise and decay. The methods previously used for measuring flow in terms of time for long duration engines, have been carried over to the testing of pulse engines but they are fundamentally incapable of providing the necessary accuracy. These methods relied on turbine type flowmeters, the inertia of which caused delays in acceleration and deceleration and therefore gave false indications of the flow and of the instantaneous rate of flow during the rise and decay periods. Where the steady state is of substantial duration this error is of slight significance and can be averaged out but it becomes intolerable as the duration is shortened, particularly when the total pulse is much less than one second. In these conditions even the error in the total flow reading is much more than can be accepted.

This can be readily appreciated when it is realized that the oxidizer consumption of a fifty pound thrust storable rocket engine during a 10 millisecond pulse is only about .001 pound and the fuel only about .0006 pound. Data acquisition to ±1% accuracy for the complete pulse requires the measurement of propellant masses to .000006 pound. This problem is further aggravated by the need to measure propellant consumed during the transient phases of the pulse. One technique which has been tried is a sight glass carrying a supply of fluid for one or more pulses, with the level photographed by a high speed camera. Although the total propellant expended for a single pulse can be determined with fair accuracy, the camera has insufficient resolution to give any indication of the amount of flow or the flow rate during the transient phases of the pulse.

The difficulties mentioned above have been completely overcome by the present invention, which in one form uses a variable volume propellant fluid container consisting of a manifold and a fluid storage bellows flow-connected to it. Normally the container holds enough fluid to run several tests of the desired pulse width, although for maximum accuracy the bellows can be so dimensioned as to collapse almost completely for a single test. A casing surrounds the bellows in gas-tight relation and is filled with gas under pressure to urge the bellows to collapse. A linear position transducer is secured to the casing and is arranged to continually sense the instantaneous axial position of the moving face or wall of the bellows. An oscillograph or other recording device is operatively connected to the transducer to receive its signals and produce a recorded trace of bellows wall position versus time. Since the bellows has previously been calibrated, this trace will represent volume change or flow. A differentiator can also be included in the circuit to produce a different trace or an additional trace which represents instantaneous flow rate versus time.

For test purposes the container is flow connected to a rocket engine, the connection including a valve which is preferably electrically operated. In operation, the valve is opened for a pulse of the desired duration and then closed. When the valve opens, the biased bellows immediately begins to collapse and eject fluid from the container into the rocket engine and continues to collapse until the valve is closed. The transducer reads the position of the moving wall of the bellows at each instant of time and sends corresponding signals to the recorder, which produces a corresponding trace. The valve control switch is preferably also connected to the recorder so that the latter will produce a voltage trace in appropriate time relation to the other trace or traces. The linear transducer is composed of a differential transformer which has a resolution of 0.0001 inch. For a typical test, such as a 200 pound thrust engine fired for 50 milliseconds, the maximum error in measurement of the total propellant expelled is far less than 0.5%. The possible error in measuring the transient phases is correspondingly low. The same results can be obtained if the transducer is a linear potentiometer.

To make the system complete the container is provided with a valved inlet port which is connected to a tank carrying a supply of propellant fluid under pressure. After each test or series of tests, the inlet valve is opened and the container refilled against the pressure of the gas in the casing to prepare it for the next test. The casing is also provided with an inlet port connected to a container of pressurizing gas. A valve may be provided for cutting off the supply during periods of non-use but the tank communicates with the casing during tests to insure constant gas pressure resulting from the large volume of the tank.

The variable volume fluid propellant container may, if desired, take the form of a casing having a rigid side wall with a suitable flexible diaphragm extending across the end or across some intermediate zone to function in substantially the same way as the bellows.

The apparatus described above is very simple and compact and produces previously unattainable accuracy in the field of very small flow, very short duration tests of pulse-mode rocket engines. It uses conventional recording devices and standard power supplies. Various other advantages and features of novelty will become apparent as the description proceeds in conjunction with the accompanying drawing, in which:

FIG. 2 is a sectional view of one form of the propellant container and ejector with the linear position transducer attached thereto; and FIG. 3 is a sectional view of a modified form of the propellant container and ejector.

Figure 1:
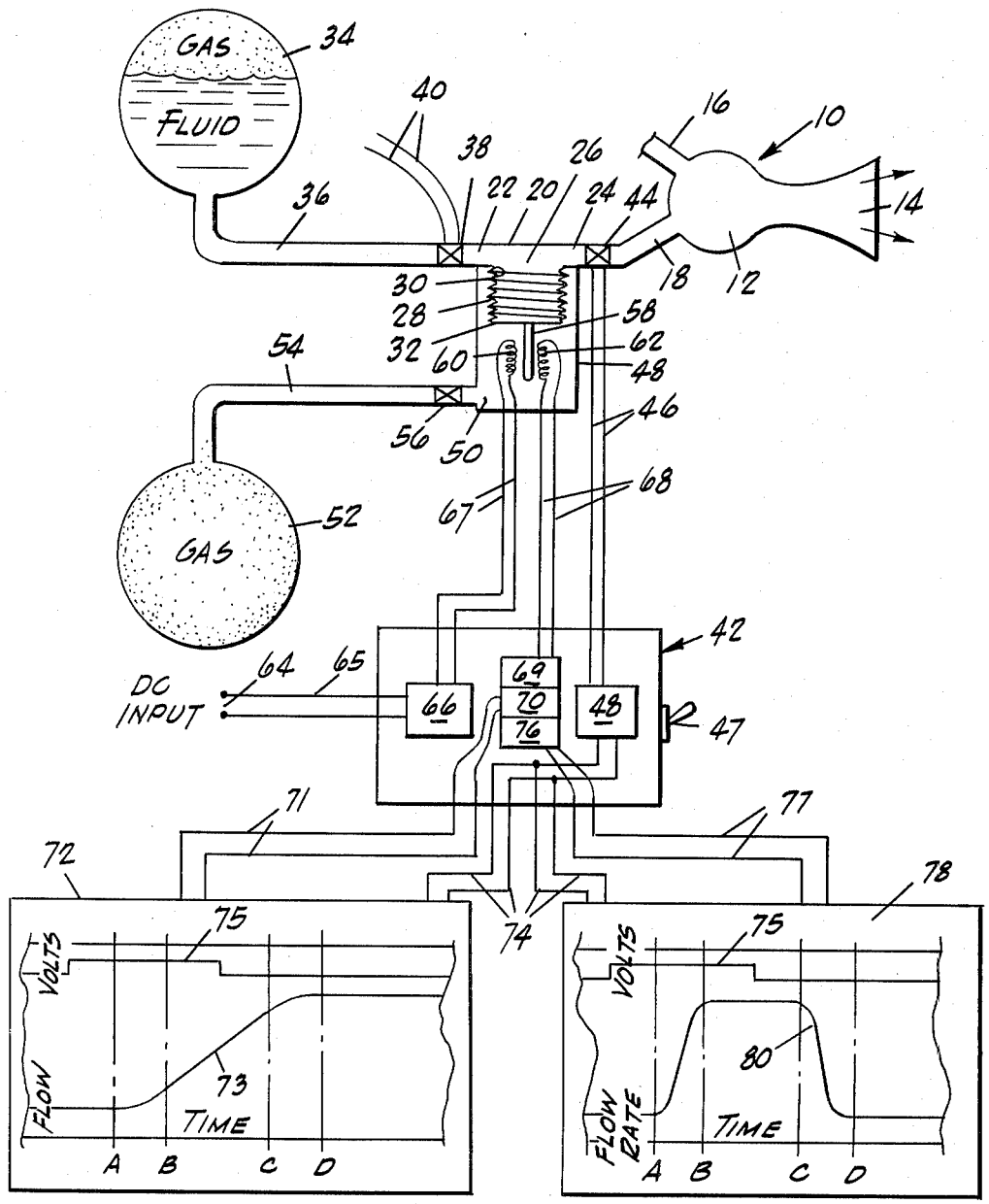
FIG. 1 is a schematic idealized representation of the measuring system of the invention.

A typical low-thrust rocket engine 10 is schematically illustrated in FIG. 1 and includes a combustion chamber 12, nozzle 14, and inlet ports 16 and 18 for fuel and oxidizer. A flow measuring system is shown connected to port 18 and it will be understood that an identical system will be connected to port 16. A standard ignition device, not shown, is provided to initiate combustion. Flow tests can be run without firing if the propellants are non-hypergolic but normally the engine is placed on a test stand and fired so that thrust measurements can be correlated with flow measurements.

The flow measuring system includes a manifold 20 having an inlet port 22 and an outlet port 24, the manifold being open at 26 for flow-communication with bellows 28. The latter has its upper end 30 open for communication with the manifold and it is secured thereto in fluid-tight relation. At its opposite end the bellows is closed by wall 32 which is movable axially, or vertically as viewed in this figure. The manifold and bellows together constitute a variable volume propellant fluid container, and collapsing action of the bellows with upward movement of wall 32 reduces the volume and expels fluid from the container.

A supply of propellant fluid under pressure is stored in tank 34 which communicates by way of conduit 36 with inlet port 22 for the purpose of filling the manifold and bellows as required. Valve 38 is located in the conduit to close off the supply when it is not needed. This valve may be actuated manually or electrically, as shown. Conductors 40 may lead to control unit 42 or to any other desired station. Valve 44 is arranged between outlet port 24 and the engine inlet port 18 to control the ejection of fluid from the container to the combustion chamber. This is preferably a solenoid operated valve for rapid actuation, and conductors 46 lead from it to the control unit 42 which is provided with the control switch 47, among other things.

A suitable timer or timing mechanism 48 is located within unit 42 and controls valve 44 and a similar valve in conduit 16 with the necessary accuracy. Obviously it is not possible to manually control pulses which may be as short as 10 milliseconds but switch 47 may be operated to set the timer in motion, the latter opening and closing both of the propellant valves and synchronizing (or leading or lagging) the fuel vs. oxidizer. The timer also starts the oscillograph, cameras, and any other necessary equipment prior to the pulse and switches them off after the pulse. Switch 47 can be tripped and then released immediately because the timer, once started, will complete the desired cycle automatically.

In order to maintain a constant force yieldingly urging the bellows toward collapsed position a casing 48 is secured to the manifold and surrounds the bellows in gas-tight relation. It is provided with an inlet port 50 to which tank 52 is connected by means of conduit 54. A valve 56 may be provided in the line to cut off the supply on occasion. Tank 52 is filled with a pressurizing gas such as helium or nitrogen which flows into and fills the pressurizing chamber formed between the bellows and the casing. The pressure of the gas in the chamber acts continually to collapse the bellows.

When valve 44 is opened on command from unit 42, the gas pressure in the chamber collapses bellows 28, ejecting fluid through the manifold outlet port 24 into the combustion chamber 12. Inlet valve 38 is, of course, closed at all times except when refilling the container. Wall 32 of the bellows moves upward in proportion to the volume of fluid expelled. Since the bellows has been calibrated in advance, the position and change of position of the wall serve to indicate the flow volume and the rate of change of position serves to indicate the flow rate. Valve 56 is open during pulsing of the engine so that the volume of tank 52 will insure substantially constant gas pressure against the bellows. Spring biasing means can be used to collapse the bellows but the gas system is presently preferred.

In the pulsing operation the movement of wall 32 of the bellows is very small and it takes place in an exceedingly short space of time, usually between 10 and 100 milliseconds. Visual observation is impossible and high speed photography would be as inaccurate as with the sight glass system. Consequently, resort is had to a linear position transducer, here shown schematically as a core member axially movable between two coils of a differential transformer. The core is a slender elongate rod 58 coaxial with the bellows and secured to wall 32 to move axially with it. Coils 60 and 62 make up the differential transformer and are actually mounted within the body of the transducer shown in FIG. 2.

Conductors 65 feed a D.C. input from 64 to a D.C.-A.C. converter 66, whence an A.C. signal flows through conductors 67 to coil 60. As the core 58 withdraws from the body of the transducer the voltage developed in coil 62 is decreased. Conductors 68 lead from coil 62 to an amplifier 69 in unit 42. The signals from the amplifier are converted by converter 70 into D.C. and are fed by conductors 71 to recorder 72 which may be a conventional high speed oscillograph. The signals delivered to recorder 72 cause it to produce trace 73 which represents total flow versus time. Actuation of timer 48 by switch 47 sends signals through conductors 74 to the recorder which produces trace 75 of low and high voltage, indicating the on and off actuation of the timer. One of the items to be determined in the test is the time delay between signal transmission by the timer and the beginning of flow at point A. The chart shows rise time A-B, from zero to full flow, steady state flow B-C, and decay time C-D.

The signals from coil 62 may also be fed to a conventional differentiator 76, also in unit 42, which differentiates the flow curve 73 and produces signals which pass through conductors 77 to recorder 78, resulting in trace 80 which represents rate of flow versus time. The distances A-B, B-C, C-D in this case represent rise time, steady state, and decay time with respect to the rate of flow. Conductors 74 also lead to recorder 78 to produce a voltage trace 75 identical to the one previously described. The system is shown here with two recorders to facilitate illustration and description but it is actually preferred to use a single recorder whereon all these traces, plus others resulting from other readings such as thrust, can be more readily compared in relation to time.

A substantially identical system can be set up using a linear potentiometer instead of a linear differential transformer. In such case the system would be entirely D.C., and no converters would be used.

It will now be seen that a very simple, compact, and rugged apparatus has been developed which overcomes the difficulties previously encountered and produces recorded measurements with the accuracy necessary for the class of work involved. Most of the components are conventional or require only minor redesign of conventional equipment. The mechanical features of the presently preferred manifold-bellows-transducer combination are illustrated in additional detail in FIG. 2.

In this figure it will be seen that manifold 20 is provided with a passageway 82 extending between the inlet and outlet ports 22 and 24. It is also provided with a plurality of flow passages 84 in one side wall which communicate with the open end 30 of bellows 28. End 30 is provided with an attachment ring 86. The ring is seated in the bottom of threaded counterbore 88 and held in place by sleeve 90 which surrounds the bellows and is threaded into the counterbore. The sleeve constitutes a part of casing 48 which is completed by cap 92 threaded on the opposite end of the sleeve. Inlet port 50 for the pressurizing gas is located in this cap.

Wall 32 of the bellows has a dome shape including a central portion 94 into which the transducer core or rod 58 is threaded. Its upward travel is limited by contact with stop 96 and the downward travel of the wall is limited by contact with inwardly extending flange 98 formed on the lower end of sleeve 90. Cap 92 carries a centrally located apertured and threaded boss 100 in which the main body 102 of the transducer is threadedly secured. Coils 60, 62 of FIG. 1 or their equivalent are located in body 102 and rod 58 is axially movable therein to vary the output of the differential transformer. The device of FIG. 2 is a complete package adapted to be connected to any rocket engine for test purposes, and to be connected to the other components of the test equipment by simple plumbing and electrical connections.

The container and ejector described above may be used for five to ten pulses without refilling. In some cases smaller devices are satisfactory and the sequence of tests is such that refilling for each test is not burdensome. In such cases a diaphram type container and ejector as illustrated in FIG. 3 is satisfactory. In this form, manifold 104 is provided with a passageway 106 extending between inlet and outlet ports 108 and 110. Flow passages 112 in one side wall communicate with chamber 114. Cylindrical section 116 is counterbored to provide a shoulder 118 which serves as a seat for the margin of diaphram 120 and the outer counterbored portion is internally threaded.

A second casing member 122 is externally threaded and is reached into section 116 to clamp the diaphram in place and provide a sealed joint, the diaphram separating chamber 114 from chamber 124. Port 126 is provided for the entry of pressurizing gas. Main body 102 of the transducer is threaded into boss 128 and the upper end of rod 58 is threaded into the central boss 130 of the diaphram. The assembly operates basically in the same manner as the assembly of FIG. 2. The volumetric displacement of the diaphram is less than that of the bellows but it is sufficient for one or two pulses. Stops can be provided as necessary or desirable. The axial movement versus volume change can be calibrated in the same fashion as the bellows type.

It will be apparent to those skilled in the art that various changes and modifications may be made in the construction and arrangement of parts disclosed herein without departing from the spirit of the invention and it is intended that all such changes and modifications shall be embraced within the scope of the following claims.

I claim:

1. A system for measuring pulse flow of propellant fluid to a rocket engine comprising: a propellant fluid manifold having an inlet port and an outlet port; a fluid storage bellows having a first, open, end in fluid communication with said manifold and having a second, closed, end; a casing secured to said manifold and surrounding said bellows in gas-tight relation thereto to form a pressurizing chamber; a linear position transducer mounted to said casing in operative relation to said bellows and arranged to sense the axial position of said second end and transmit an electrical signal indicative thereof; an oscillograph operatively connected to said transducer to record said position in relation to time intervals; a container of pressurizing gas; a conduit connecting said container to said casing to supply gas thereto under pressure to urge said bellows toward collapsed position; a container for pressurized propellant fluid; a conduit connecting said container to the inlet port of said manifold to conduct pressurized fluid to fill said manifold and said bellows against the collapsing force of said pressurizing gas; an inlet valve to control the flow of fluid into said manifold; a conduit for connecting the outlet port of said manifold to said engine; and an outlet valve to control the flow of fluid from said manifold to said engine; said bellows collapsing at least partially to transfer fluid to said engine during pulsed openings of said outlet valve; said transducer sensing the axial position of the second end of the bellows at each instant during the period of fluid flow; and said oscillograph tracing a record of the successive instantaneous positions of said second end in relation to time.

2. A system for measuring pulse flow of propellant fluid to a rocket engine comprising: a propellant fluid manifold having an inlet port and an outlet port; a fluid storage bellows having a first, open, end in fluid communication with said manifold and having a second, closed, end; a casing secured to said manifold and surrounding said bellows in gas-tight relation thereto to form a pressurizing chamber; a linear position transducer mounted to said casing in operative relation to said bellows and arranged to sense the axial position of said second end and transmit an electrical signal indicative thereof; an oscillograph operatively connected to said transducer to record said position in relation to time intervals; means to supply gas under pressure to said chamber to urge said bellows toward collapsed position; means to supply propellant fluid to said manifold and bellows under pressure to fill them against the collapsing force of the pressurizing gas; means to flow-connect a rocket engine to said manifold; and valve means to control the flow of fluid from said manifold to said engine; said bellows collapsing at least partially to transfer fluid to said engine during pulsed openings of said valve means; said transducer sensing the axial position of the second end of the bellows at each instant during the period of fluid flow; and said oscillograph tracing a record of the successive instantaneous positions of said second end in relation to time.

3. A system for measuring pulse flow of propellant fluid to a rocket engine comprising: a propellant fluid manifold; a fluid storage bellows having a first, open, end in fluid communication with said manifold and having a second, closed, end; a casing secured to said manifold and surrounding said bellows in gas-tight relation thereto to form a pressurizing chamber; a supply of gas under pressure in said chamber to continually urge said bellows toward collapsed position; a linear position transducer mounted to said casing in operative relation to said bellows and arranged to sense the axial position of said second end and transmit an electrical signal indicative thereof; an oscillograph operatively connected to said transducer to record said position in relation to time intervals; means to provide a supply of propellant fluid under pressure in said manifold and bellows; means to flow-connect a rocket engine to said manifold; and valve means to control the flow of fluid from said manifold to said engine; said bellows collapsing at least partially to transfer fluid to said engine during pulsed openings of said valve means; said transducer sensing the axial position of the second end of the bellows at each instant during the period of fluid flow; and said oscillograph tracing a record of the successive instantaneous positions of said second end in relation to time.

4. A system for measuring pulse flow of propellant fluid to a rocket engine comprising: a propellant fluid manifold; a fluid storage bellows having a first, open, end in fluid communication with said manifold and having a second, closed, end to constitute with said manifold a variable volume container; means to resiliently urge said bellows toward collapsed position to transfer fluid from said manifold; means to continually sense the instantaneous axial position of the second end of said bellows and transmit an electrical signal indicative thereof; a time-displacement recording device operatively connected to said sensing means; means for flow-connecting said manifold to a rocket engine; and valve means for controlling the outflow of propellant fluid from said manifold.

5. A system for measuring pulse flow of propellant fluid to a rocket engine comprising: a propellant fluid manifold; a fluid storage bellows having a first, open, end in fluid communication with said manifold and having a second, closed end to constitute with said manifold a variable volume container; means to resiliently urge said bellows toward collapsed position to transfer fluid from said manifold; means for flow-connecting said manifold to a rocket engine; valve means for controlling the outflow of propellant fluid from said manifold; means to continually sense the instantaneous axial position of the second end of said bellows and transmit an electrical signal indicative thereof; means connected to said sensing signal means to accept said signal and translate it into a recorded trace of integrated total flow versus time; and means connected to said sensing means to accept said signal and translate it into a differentiated recorded trace of instantaneous rate of flow versus time.

6. A system as claimed in claim 5; and, in addition thereto, electrical means to control the opening and closing of said valve means; and means to produce a recorded trace of the activation and de-activation of said control means versus time.

7. A system as claimed in claim 6; all of said recording means being adapted to produce traces contemptoraneously on a single record sheet for purposes of comparison.

8. A system for meauring pulse flow of propellant fluid to a rocket engine comprising: a propellant fluid container having means for flow-connection to a rocket engine; means to eject fluid from said container in small quantities during short duration pulses; outlet valve means to control the flow of fluid from said container; mechanical means movable to successive positions to indicate the quantity of fluid ejected; electrical means to continually sense the instantaneous positions of said mechanical means; and means connected to said electrical means to translate said positive sensings into a recorded trace of fluid flow versus time.

9. A system for measuring pulse flow of propellant fluid to a rocket engine comprising: a propellant fluid container having a movable wall to vary its volume, the movement of said wall being calibrated in terms of volume; means to resiliently urge said wall in a direction to reduce the volume of the container and expel a portion of its contents; means for flow-connecting said container to a rocket engine; valve means for controlling the outflow of fluid from said container; means to continually sense the instantaneous position of said wall and transmit an electrical signal indicative thereof; and means connected to said sensing means to accept said signal and translate it into a recorded trace of fluid flow versus time.

10. A system as claimed in claim 9; said translating means including means to produce an integrated trace of total flow volume versus time and means to produce a differentiated trace of instantaneous rate of flow versus time.

11. A system as claimed in claim 9; and, in addition thereto, electrical means to control the opening and closing of said valve means; and means to produce a recorded trace of the activation and de-activation of said control means versus time.

References Cited by the Examiner

UNITED STATES PATENTS

| 2,333,164 | 11/1943 | Fisher | 73—198 |
| 2,654,245 | 10/1953 | Hill | 73—113 X |
| 2,709,430 | 5/1955 | Traugott | 73—262 X |
| 2,866,331 | 12/1958 | Michie | 73—113 |
| 2,961,868 | 11/1960 | Hooper | 73—149 X |
| 3,018,923 | 1/1962 | Michie | 73—114 X |
| 3,097,483 | 7/1963 | Bixson et al. | 60—35.6 |
| 3,117,417 | 1/1964 | Rutkowski | 60—35.6 |

FOREIGN PATENTS 806,738  10/1936  France.

RICHARD C. QUEISSER, *Primary Examiner.*

DAVID SCHONBERG, E. D. GILHOOLY,
*Assistant Examiners.*